(12) United States Patent
Chen et al.

(10) Patent No.: US 7,559,476 B2
(45) Date of Patent: Jul. 14, 2009

(54) THIN MFP (MULTIFUNCTION PERIPHERAL)

(75) Inventors: Ching-Hui Chen, Sindian (TW);
Yan-Liang Guo, Taipei (TW)

(73) Assignee: Lite-On Technology Corporation,
Taipei (TW)

( * ) Notice: Subject to any disclaimer, the term of this patent is extended or adjusted under 35 U.S.C. 154(b) by 748 days.

(21) Appl. No.: 11/353,083

(22) Filed: Feb. 14, 2006

(65) Prior Publication Data

US 2007/0187503 A1 Aug. 16, 2007

(51) Int. Cl.
*G06K 7/10* (2006.01)
(52) U.S. Cl. .................. 235/472.01; 347/108; 347/109; 347/129
(58) Field of Classification Search ............ 235/472.01; 347/108, 109; 358/1.15, 505
See application file for complete search history.

(56) References Cited

U.S. PATENT DOCUMENTS 5,306,908 A * 4/1994 McConica et al. .......... 250/234
6,015,211 A * 1/2000 Kinoshita et al. ........... 347/109
6,350,980 B1 * 2/2002 Bohn ....................... 250/208.1
7,140,792 B2 * 11/2006 Silverbrook ................. 400/88
2001/0038410 A1 * 11/2001 Kubota et al. ............... 347/108
2005/0088683 A1 * 4/2005 Silverbrook ............... 358/1.15

* cited by examiner

*Primary Examiner*—Ahshik Kim
(74) *Attorney, Agent, or Firm*—Rabin & Berdo, P.C.

(57) ABSTRACT

A thin MFP includes a scanning module, a printing module, a paper advance module, a paper switch module and a paper-guiding module all disposed in a casing thereof. Both the scanning module and the printing module are fixed on the same plane. The paper advance module has a first paper advance box and a second paper advance box for guiding paper into the casing, respectively. The paper switch module mates with the paper advance module for selectively guiding paper from the first paper advance box or the second paper advance box. The paper-guiding module mates with the paper switch module for guiding paper from the paper switch module to the scanning module for scanning or to the printing module for printing. Whereby, the size of the thin MFP is reduced by changing the disposition of the scanning module and the printing module and sharing the paper-guiding module.

8 Claims, 5 Drawing Sheets

THIN MFP (MULTIFUNCTION PERIPHERAL)

BACKGROUND OF THE INVENTION

1. Field of the Invention

The present invention relates to a thin MFP (Multifunction Peripherals), and particularly relates to a scanning module and a printing module arranged on the same plane, and the scanning module and the printing module for sharing a paper-guiding module to scan documents or to print on blank paper.

2. Description of the Related Art

According to the development of science and technology and the user's demand, modern information products tend to have multi-functional designs, in order to be able to perform multiple functions within the same machine such as MFPs (Multi Function Peripherals). The overall design reduces the size of a product and improves the user's working efficiency.

FIG. 1 shows a lateral, cross-sectional, schematic view of an MFP of the prior art. The MFP of the prior art has a scanning module 20a and a printing module 30a stacked upon each other in a casing 10a thereof. Moreover, the operation function and the related structure of both the scanning module 20a and the printing module 30a are separated from each other. Therefore, there is no any common structure adapted for the scanning module 20a and the printing module 30a in the prior art. Thus, the size of the prior MFP is larger and cannot be reduced.

SUMMARY OF THE INVENTION

The present invention provides a thin MFP (Multifunction Peripheral). The thin MFP has a scanning module and a printing module disposed on the same plane and in a casing thereof. Hence, the scanning module and the printing module share a paper-guiding module. In other words, the present invention reduces the size of the prior MFP, saves on using space and increases work efficiency by changing the disposition of the scanning module and the printing module and sharing the paper-guiding module.

Moreover, when using the scanning function, documents are guided to a track of a paper-guiding module by a paper advance module mated with the paper switch module. Thus, the document paper can be transmitted to a scanning area of the scanning module for scanning.

Furthermore, when using the printing function, blank paper is guided to the track of the paper-guiding module by the paper advance module mated with the paper switch module. Thus, blank paper can be transmitted to a printing area of a printing module for printing.

A first aspect of the present invention is a thin MFP (Multifunction Peripherals) that comprises a casing, a scanning module, a printing module, a paper advance module, a paper switch module and a paper-guiding module. The scanning module is disposed in the casing. The printing module is disposed in the casing and on the same plane as the scanning module. The paper advance module is disposed in the casing, and the paper advance module has a first paper advance box and a second paper advance box for guiding paper into the casing, respectively. The paper switch module is disposed in the casing and mated with the paper advance module for selectively guiding paper that come from the first paper advance box or the second paper advance box. Moreover, the paper-guiding module is disposed in the casing and is mated with the paper switch module for guiding paper from the paper switch module to the scanning module for scanning or to the printing module for printing.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED BEST MOLDS

Figure 1:
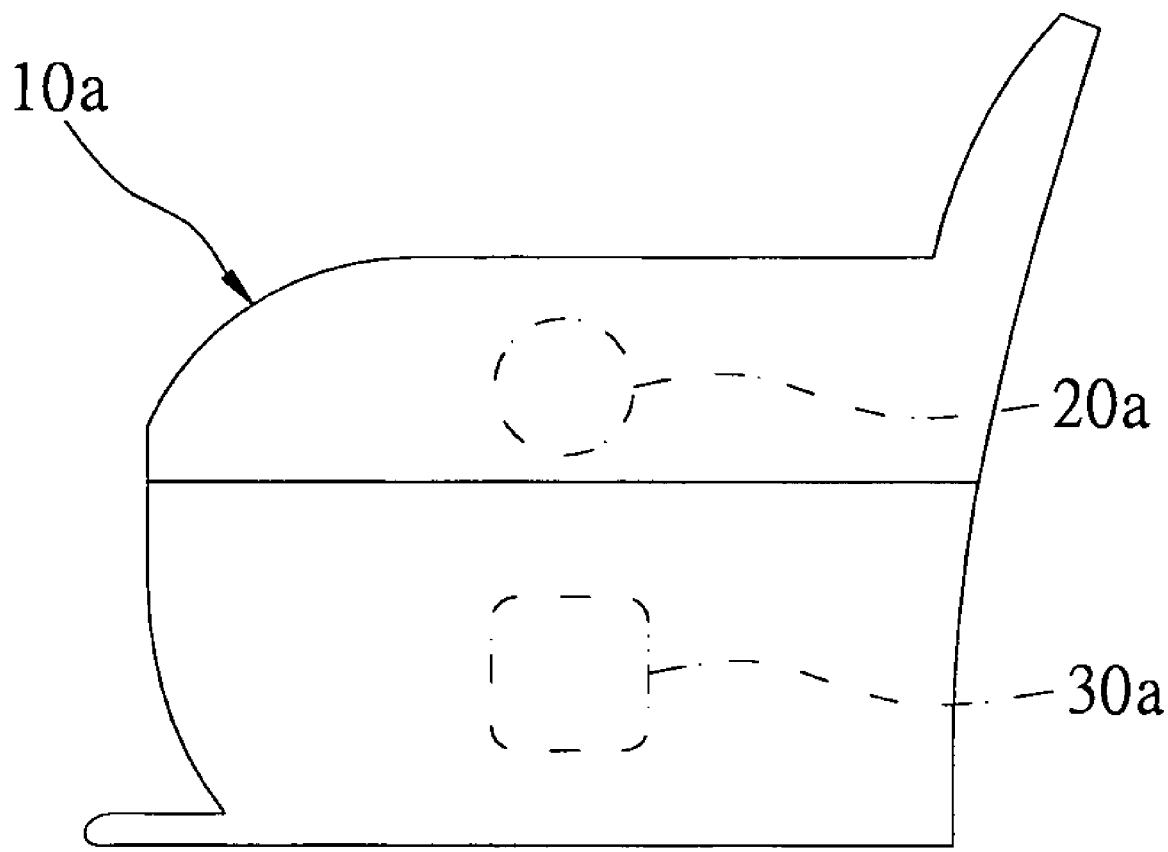
FIG. 1 is a lateral, cross-sectional, schematic view of an MFP of the prior art.
Figure 2:
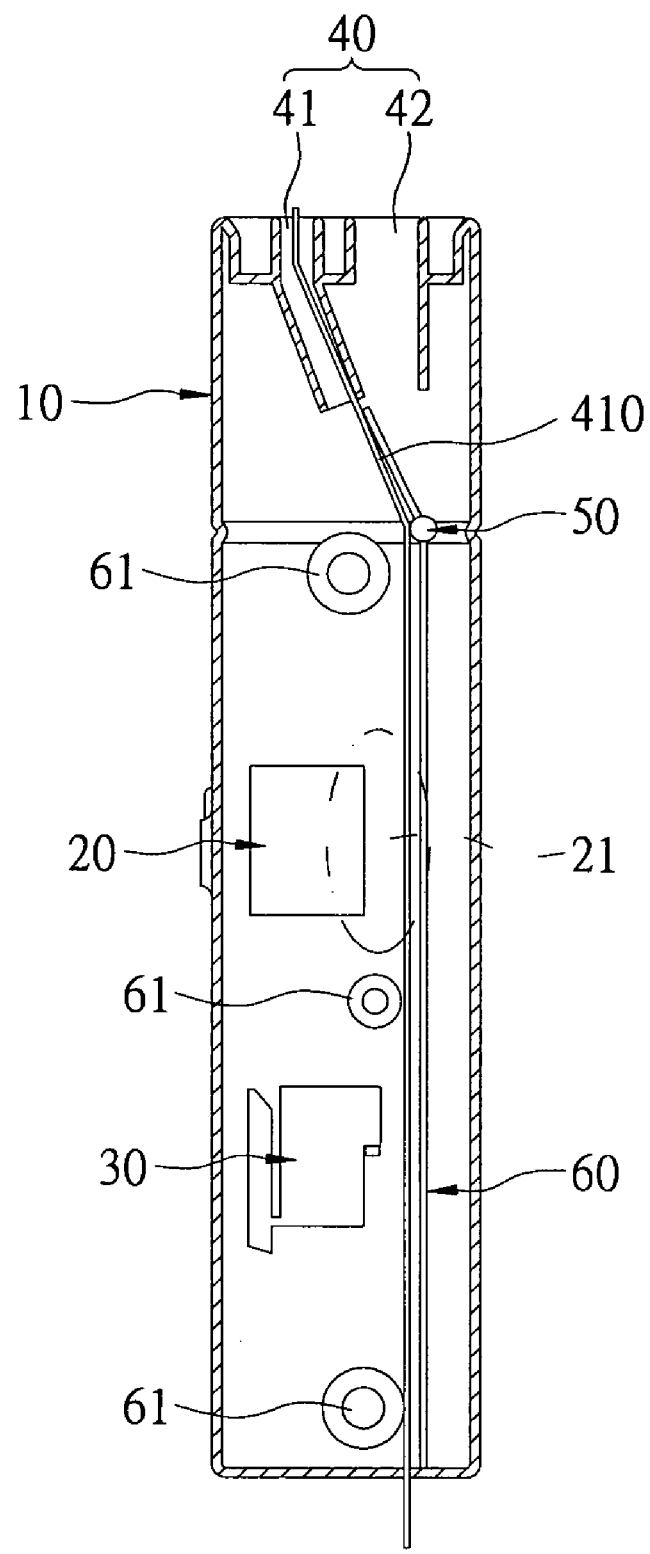
FIG. 2 is a lateral, cross-sectional, schematic view of an MFP performing scanning according to the present invention.
Figure 3:
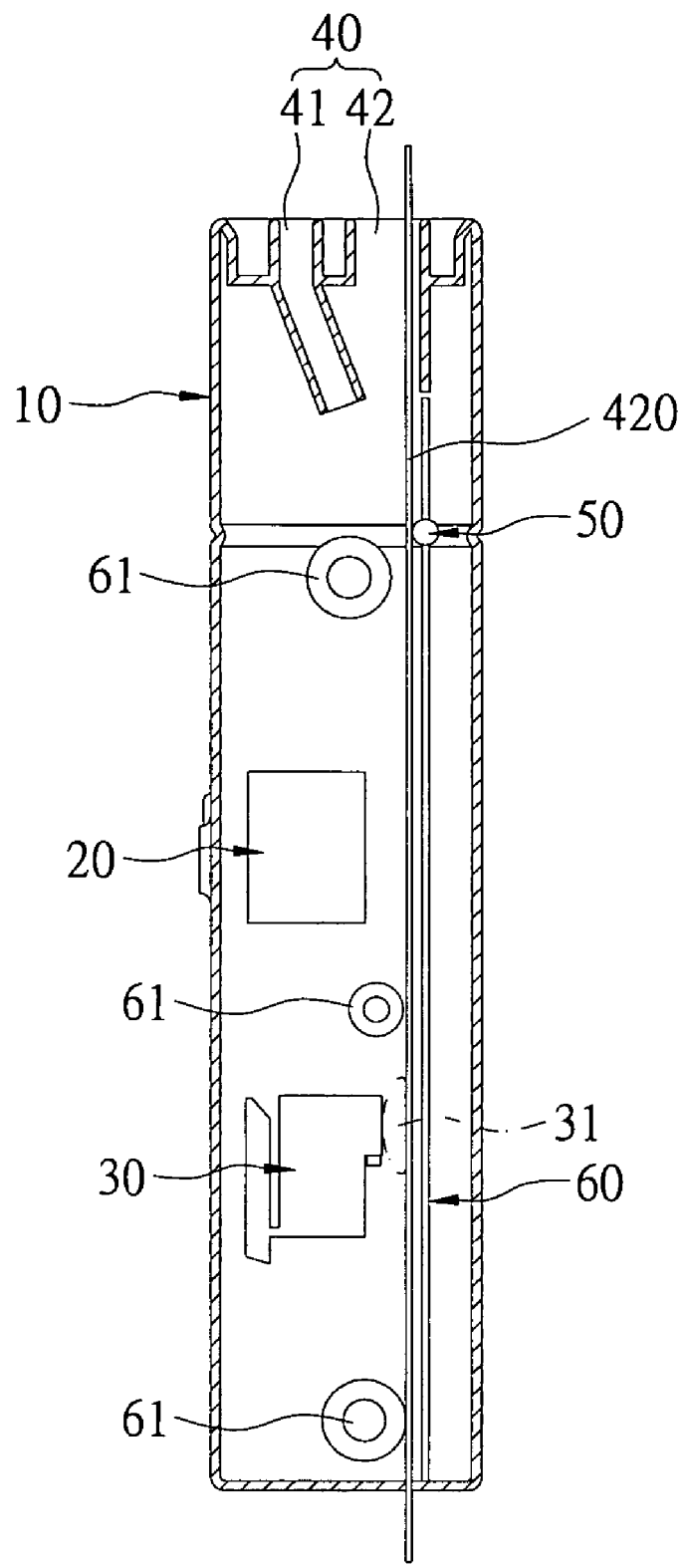
FIG. 3 is a lateral, cross-sectional, schematic view of an MFP performing printing according to the present invention.

FIGS. 2 and 3 show two lateral, cross-sectional, schematic views of an MFP performing scanning and printing according to the present invention, respectively. The present invention provides a thin MFP (Multifunction Peripheral) that includes a casing 10, a scanning module 20, a printing module 30, a paper advance module 40, a paper switch module 50 and a paper-guiding module 60.

Both the scanning module 20 and the printing module 30 are disposed in the casing 10 and are on the same plane. Moreover, the scanning module 20 has a scanning area 21 facing the same direction as a printing area 31 of the printing module 30.

In addition, the paper advance module 40 is disposed in the casing 10, and the paper advance module 40 has a first paper advance box 41 and a second paper advance box 42 for guiding paper into the casing 10, respectively. Moreover, the first paper advance box 41 is a document paper advance box for receiving documents 410, and the second paper advance box 42 is a blank paper advance box for receiving blank paper 420. However, any kind and size of paper can be received in the first paper advance box 41 and the second paper advance box 42 according to a user's needs.

Furthermore, the paper switch module 50 is disposed in the casing 10 and mated with the paper advance module 40 for selectively guiding paper from the first paper advance box 41 or the second paper advance box 42. In other words, the paper switch module 50 can determine to guide which paper advance box according to in either a manual way, according to the user's choice, or in an automatic way. For example, when the user wants to scan documents 410, the user can switch the paper switch module 50 to guide the documents 410 of the first paper advance box 41 manually; or when documents 410 is set in the first paper advance box 41, the paper switch module 50 can automatically detect the source of the documents 410 and be automatically switched to guide the documents 410 of the first paper advance box 41.

Moreover, the paper-guiding module 60 is disposed in the casing 10 and mated with the paper switch module 50. In addition, the paper-guiding module 60 has a constant roller set for guiding the paper, and the constant roller set has a plurality of constant rollers 61 mated with each other for guiding paper from the paper switch module 50 to the scanning module 20 for scanning or to the printing module 30 for printing.

As can be seen in FIG. 2, when using the scanning function, the documents 410 is guided to a track of the paper-guiding module 60 by the paper advance module 40 mated with the paper switch module 50. Thus, the documents 410 are transmitted to the scanning area 21 of the scanning module 20 for scanning.

As can be seen in FIG. 3, when using the printing function, the blank paper 420 is guided to the track of the paper-guiding module 60 by the paper advance module 40 mated with the paper switch module 50. Thus, the blank paper 420 is transmitted to the printing area 31 of the printing module 30 for printing.

Figure 4:
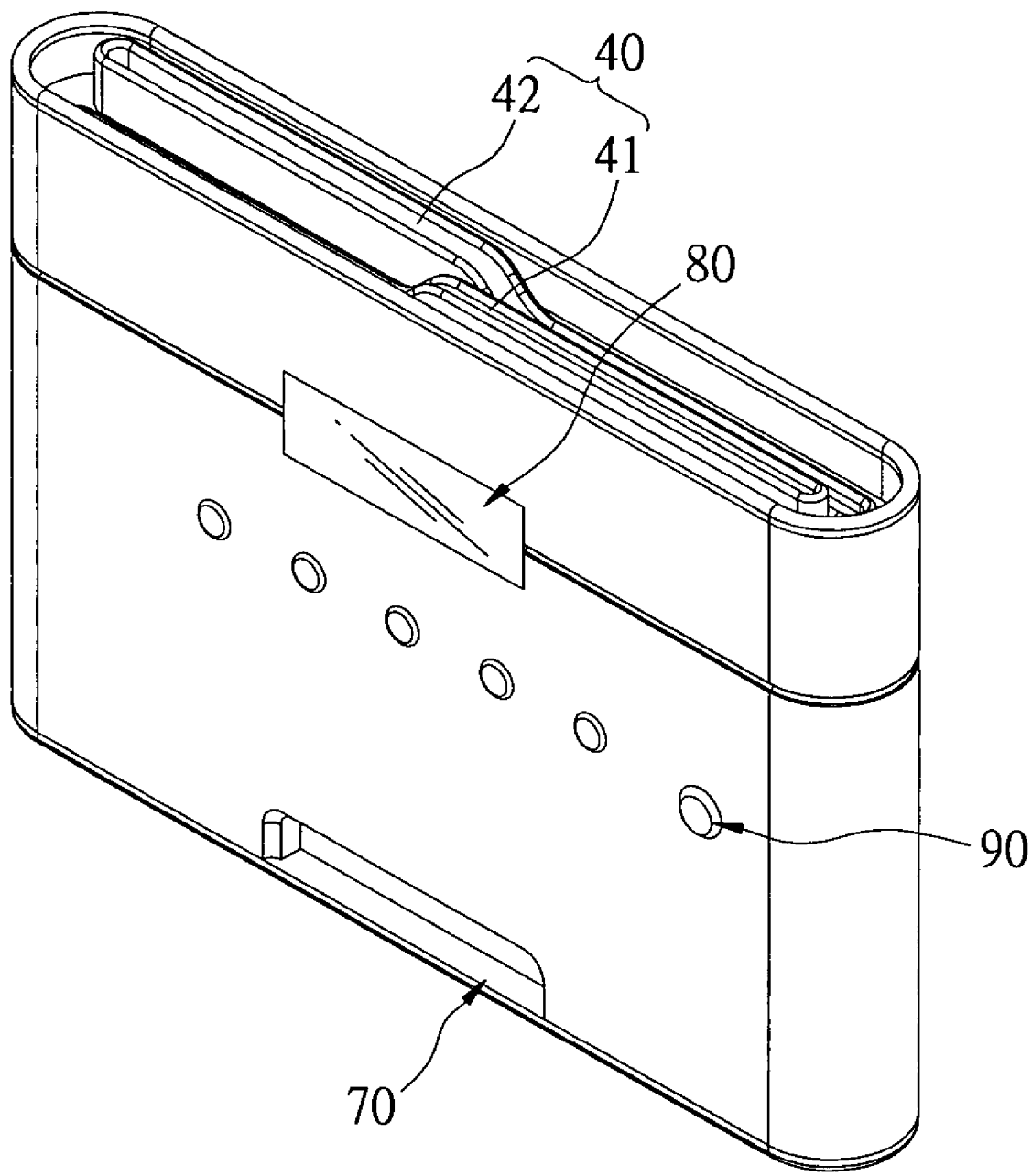
FIG. 4 is a perspective view of an MFP according to the present invention.
Figure 5:
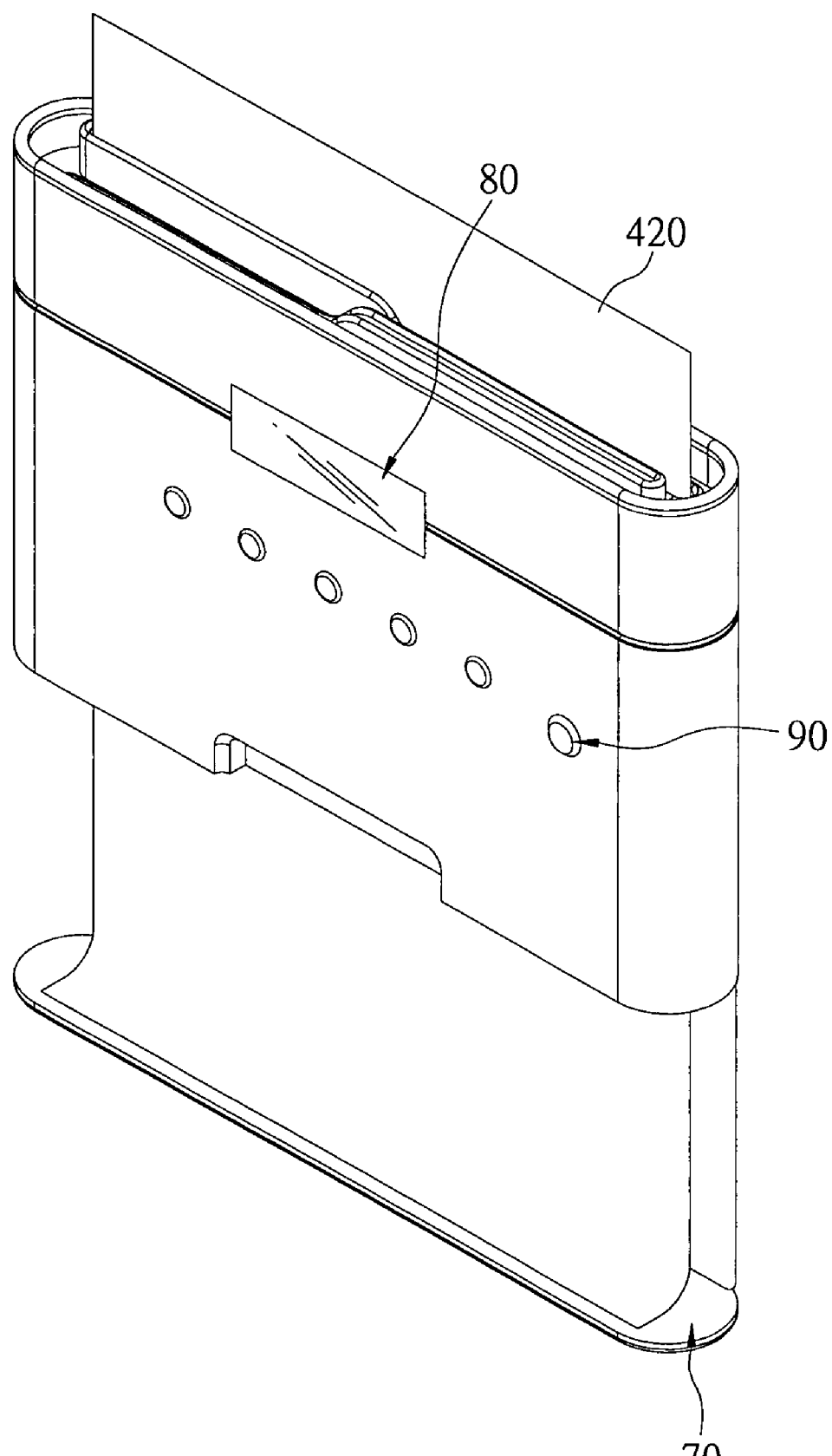
FIG. 5 is a perspective view of an MFP in use according to the present invention.

FIG. 4 shows a perspective view of an MFP according to the present invention. FIG. 5 shows a perspective view of an MFP in use according to the present invention. The thin MFP further comprises a paper tray 70 telescopically disposed in the casing 10 for holding the paper that has been scanned or printed. In other words, when using the thin MFP of the present invention, the paper tray 70 can be pulled out from the casing 10 for holding the documents 410 or the blank paper 420 that has completed scanning or printing, thereby preventing paper from falling to the ground.

Moreover, the thin MFP further comprises a display module 80 disposed on an outside of the casing 10 for displaying the using status or related parameters of the thin MFP. In addition, the thin MFP further comprises a plurality of control buttons 90 disposed on the outside of the casing 10. Hence, the user can operate the control buttons 90 for manual scanning or printing, or set related parameters.

Furthermore, the thin MFP of the present invention can set many pieces of documents 410 or blank paper 410 in a paper advance box (not shown) of a common paper advance module (not shown) at the same time. Therefore, the documents 410 can be transmitted automatically to the scanning area 21 of the scanning module 20 for scanning in sequence. Alternatively, the blank paper 420 can be transmitted automatically to the printing area 31 of the printing module 30 for printing in sequence.

In conclusion, the thin MFP has two key technologies as described below:

1. A Horizontal Design:

Both the scanning module 20 and the printing module 30 are horizontally fixed on the same plane for substantially reducing the size of the product. Moreover, many pieces of paper can be automatically and continuously transmitted for scanning or printing via the common paper advance module. Hence, the present invention not only reduces the size of the product, but also increases the efficiency of scanning or printing.

2. An Innovative Advancing Paper Design:

The design is composed of the paper advance module 40, the paper switch module 50 and the paper-guiding module 60. For example, when scanning, the paper switch module 50 is automatically switched to the first paper advance box 41 of the paper advance module 40 to guide the documents 410 into the scanning area 21 of the scanning module 20 via the paper-guiding module 60 for scanning. Alternatively, when printing, the paper switch module 50 is automatically switched to the second paper advance box 42 of the paper advance module 40 to guide the blank paper 420 into the printing area 31 of the printing module 30 via the paper-guiding module 60 for printing.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A thin MFP (Multifunction Peripheral), comprising:
   a casing;
   a scanning module disposed in the casing;
   a printing module disposed in the casing and on the same plane as the scanning module;
   a paper advance module disposed in the casing, wherein the paper advance module has a first paper advance box and a second paper advance box for guiding paper into the casing, respectively;
   a paper switch module disposed in the casing and mated with the paper advance module for selectively guiding paper that comes from the first paper advance box or the second paper advance box; and
   a paper-guiding module disposed in the casing and mated with the paper switch module for guiding paper from the paper switch module to the scanning module for scanning or to the printing module for printing.

2. The thin MFP as claimed in claim 1, wherein the scanning module has a scanning area and the printing module has a printing area, and both the scanning area and the printing area face the same direction.

3. The thin MFP as claimed in claim 1, wherein the first paper advance box is a document paper advance box for receiving documents.

4. The thin MFP as claimed in claim 1, wherein the second paper advance box is a blank paper advance box for receiving blank paper.

5. The thin MFP as claimed in claim 1, wherein the paper-guiding module has a constant roller set for guiding the paper.

6. The thin MFP as claimed in claim 1, further comprising a paper tray telescopically disposed in the casing for holding the paper that has been scanned or printed.

7. The thin MFP as claimed in claim 1, further comprising a display module disposed on an outside of the casing.

8. The thin MFP as claimed in claim 1, further comprising a plurality of control buttons disposed on an outside of the casing.

* * * * *